(12) United States Patent
Huebsch

(10) Patent No.: US 6,563,326 B1
(45) Date of Patent: May 13, 2003

(54) BUS-DRIVEABLE SENSOR APPARATUS WITH DIRECTION-DEPENDENT CURRENT/ VOLTAGE CHARACTERISTIC CURVE AND METHOD FOR TESTING THE APPARATUS

(75) Inventor: Thomas Huebsch, Deisenhofen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,014

(22) PCT Filed: May 18, 1999

(86) PCT No.: PCT/DE99/01487
§ 371 (c)(1),
(2), (4) Date: Dec. 19, 2000

(87) PCT Pub. No.: WO00/03368
PCT Pub. Date: Jan. 20, 2000

(30) Foreign Application Priority Data

Jul. 9, 1998 (DE) .......................................... 198 30 772

(51) Int. Cl.⁷ .................. G01R 27/02; G01R 31/26; G08B 26/00; H04Q 5/22
(52) U.S. Cl. ................... 324/609; 324/767; 340/505; 340/10.4
(58) Field of Search .................. 324/609, 767; 361/6; 340/505, 10.4

(56) References Cited

U.S. PATENT DOCUMENTS

| | | | | |
|---|---|---|---|---|
| 3,832,510 A | * | 8/1974 | Pfau et al. .................. 219/69 |
| 5,132,865 A | * | 7/1992 | Mertz et al. .................. 361/6 |
| 5,220,467 A | * | 6/1993 | Zucker ........................ 360/66 |
| 5,345,161 A | * | 9/1994 | Zieve ........................... 320/1 |
| 5,769,948 A | * | 6/1998 | Oh et al. ..................... 118/500 |
| 5,894,395 A | * | 4/1999 | Baurand et al. .............. 361/87 |

FOREIGN PATENT DOCUMENTS

| | | | |
|---|---|---|---|
| DE | WO 92/01285 | * | 1/1992 |
| EP | 0 093 872 A | | 11/1983 |
| GB | 2 137 790 A | | 10/1984 |

\* cited by examiner

Primary Examiner—Christine Oda
Assistant Examiner—Wasseem H. Hamdan
(74) Attorney, Agent, or Firm—Michael J. Striker

(57) ABSTRACT

The current invention provides a bus-drivable sensor apparatus (10) having a first and a second bus input (a1, b1) for connecting to a corresponding first and second bus line (B⁻, B⁺), which have a corresponding first and second potential in normal bus operation; a control device (100), which is connected to the first and second bus input (a1, b1); a sensor contact (50) with at least two different contact states, which is connected on its first connection to the first bus input (a1); and a sensor contact state detecting device (150), which is connected to the second connection of the sensor contact (50) and the control device (100) in order to detect the contact state of the sensor contact (50) and to transmit this information to the control device (100); wherein the control device (100) is embodied in such a way that it reacts to a certain transmitted contact state by triggering a predetermined control function. A switching element with a direction-dependent current/voltage characteristic curve (SE; D1) is designed and connected between the second connection of the sensor contact (50) and the second bus input (b1) in such a way that it essentially does not influence the normal bus operation, independent of the contact state of the sensor contact (50). This provides a simple possibility for testing the sensor contact.

10 Claims, 5 Drawing Sheets

BUS-DRIVEABLE SENSOR APPARATUS WITH DIRECTION-DEPENDENT CURRENT/VOLTAGE CHARACTERISTIC CURVE AND METHOD FOR TESTING THE APPARATUS

PRIOR ART

The current invention relates to a bus-drivable sensor apparatus with a first and a second bus input for connecting to a corresponding first and second bus line, which have a corresponding first and second potential in normal bus operation; a control device which is connected to the first and second bus input; a sensor contact with at least two different contact state, which is connected with its first connection to the first bus input; and a sensor contact state detecting device which is connected to the second connection of the sensor contact and the control device in order to detect the contact state of the sensor contact and to transmit this to the control device; wherein the control device is embodied in such a way that it reacts to a particular contact state being transmitted by triggering a predetermined control function. The invention also relates to a corresponding testing method.

Although it can be used on any bus-drivable sensor apparatuses, the current invention and the problem underlying it will be explained in relation to a sensor apparatus with a reed switch, which can be operated on a field bus or sensor/actuator bus.

FIG. 4 is a schematic circuit diagram of a conventional arrangement of a number of known sensor apparatuses operated in a ring on a field bus or sensor/actuator bus.

In FIG. 4, S1 to S8 indicate sensor apparatuses, B+ and B− indicate a first positive-and a second negative bus line looped through the sensor apparatuses S1 to S8, and ZE indicates a central unit or a central computer.

The sensor apparatuses S1 to S8 are used for different or similar monitoring purposes, e.g. glass breakage alarms, fire alarms, hail alarms, closing alarms, etc. They each contain a sensor contact, which has at least two different contact states, which can be influenced by the variable to be monitored. Reacting to a particular contact state, a control device provided in the respective sensor apparatus can send an alarm via the bus to the central computer, which can execute further measures.

FIG. 5 is a schematic circuit diagram of a known bus-drivable sensor apparatus.

In FIG. 5, in addition to the reference numerals introduced above, 10 indicates a sensor apparatus, 50 indicates a sensor contact, 100 indicates a control device, 150 indicates a sensor contact state detecting device, b1 indicates a bus input for B+, b1' indicates a bus output for B+, a1 indicates a bus input for B+, a1' indicates a bus output for B−, K1 and K2 indicate nodes, 20a and 20b indicate an addressing device with a respective parallel connection of a switch with a diode, and E1–E4 indicate ports of 100 or 150.

The sensor apparatus constructed in this manner operates as follows.

The first and second bus input a1, b1 are connected to the corresponding first and second bus line B−, B+, which have a corresponding first and second potential in normal bus operation, in this instance for example, the bus line B− has a negative potential and the bus line B+ has a positive potential.

When the sensor contact 50, which in this instance is embodied as a reed switch, is triggered by means of a magnetic field, the negative potential of the bus line B− is conveyed to the port E2 of the sensor contact state detecting device 150 which is connected to the second connection of the sensor contact 50 and the control device 100. The sensor contact state detecting device 150 is used to detect the contact state of the sensor contact 50 and to transmit this to the control device 100. The control device 100 is embodied in such a way that it reacts to a particular transmitted contact state—e.g. a closing of the normally open switch—by triggering a predetermined control function. In this instance, this control function is comprised in that it reacts to a particular transmitted contact state by sending a message via the bus, i.e. via the bus outputs a1', b1' to the central computer ZE, which then triggers an alarm, for example.

The addressing device 20a and 20b with the corresponding parallel connection of a switch with a diode to the left and right of the node K2 is required for addressing the sensor apparatus 10, because the field bus depicted is a daisy chain system with automatic addressing.

Generally sensor contacts tend to wear down, particularly those with mechanical components. It is therefore necessary to test network components in the form of such sensor apparatuses S1 to S8 connected via a bus as to their correct function, e.g. the opening and closing of the reed switch.

However, since sensor apparatus comprises an enclosed, i.e. usually encapsulated unit which is only accessible from the outside by.means of the bus inputs a1, b1 and bus outputs a1', b1', an error diagnosis of the sensor contact always requires more effort for the installer or maintenance worker. In this connection, the port E2 cannot be accessed from the outside in order to test the function of the sensor contact 50.

Currently, special, complex, and expensive testing apparatuses are required for this purpose which vary depending on the bus technology. These special testing apparatuses can only be used for this special testing function.

The disadvantage of above approach is that it involves high costs and requires a lot of operational effort.

ADVANTAGES OF THE INVENTION

The bus-drivable sensor apparatus according to the invention and the corresponding, testing method have the advantage over the prior embodiment approach that they offer the possibility of a simple external testing without requiring a manual intervention of the user into the sensor apparatus itself and without requiring a special, expensive testing apparatus. A simple conventional multimeter is therefore entirely sufficient for testing.

The idea underlying the current invention is comprised in that a switching element with a direction-dependent current/voltage characteristic curve is provided, which is connected between the first connection of the sensor contact and the second bus input in such a way that it essentially does not influence the normal bus operation independent of the contact state of the sensor contact.

In other words, in normal bus operation according to a first polarity, the switching element with the direction-dependent current/voltage characteristic curve functions as a high-ohm resistor and in testing operation according to a second polarity,in which the sensor apparatus is uncoupled from the bus, the switching element functions as a low-ohm resistor.

According to a preferred modification, the switching element with the direction-dependent current/voltage characteristic curve is wired in such a way that in a testing operation in which the first and second bus input are connected to a third and fourth potential, which have a potential difference with a different sign than the first and second potential, a current/voltage characteristic curve that is a function of the contact state of the sensor contact can be detected at the first and second bus input.

According to another preferred modification, the switching element with the direction-dependent current/voltage characteristic curve is a first diode device, which is connected with its positive connection to the second connection of the sensor contact and is connected with its negative connection to the second bus input, wherein the first potential is lower than the second potential. As a result, the switching element with the direction-dependent current/voltage characteristic curve can be easily constituted by a passive switching element.

According to another preferred modification, the control device has a second diode device, in particular as an electromagnetic compatibility safety device, which is connected in parallel to the first diode device in a contact state of the sensor contact. In this connection, the threshold voltage of the first diode device is lower than the threshold voltage of the second diode device.

According to another preferred modification, the control device is embodied in such a way that it reacts to a particular transmitted contact state by sending a message via the bus.

According to another preferred modification, a first and second bus output, which are connected to the control device, are provided for connecting to another first and second bus line.

According to another preferred modification, the sensor contact is a switch element, in particular a reed switch, thermal circuit breaker, induction switch, or optical switch.

According to another preferred modification, an addressing device is provided, which is disposed between the second bus input and the second bus output. As a result, the sensor apparatuses can be provided with unique addresses or identifiers in order to be able to transmit specific messages with a unique association between the sensor apparatuses and the central computer.

DRAWINGS

Exemplary embodiments of the invention are shown in the drawings and will be explained in detail in the subsequent description.

DESCRIPTION OF THE EXEMPLARY EMBODIMENTS

Figure 1:
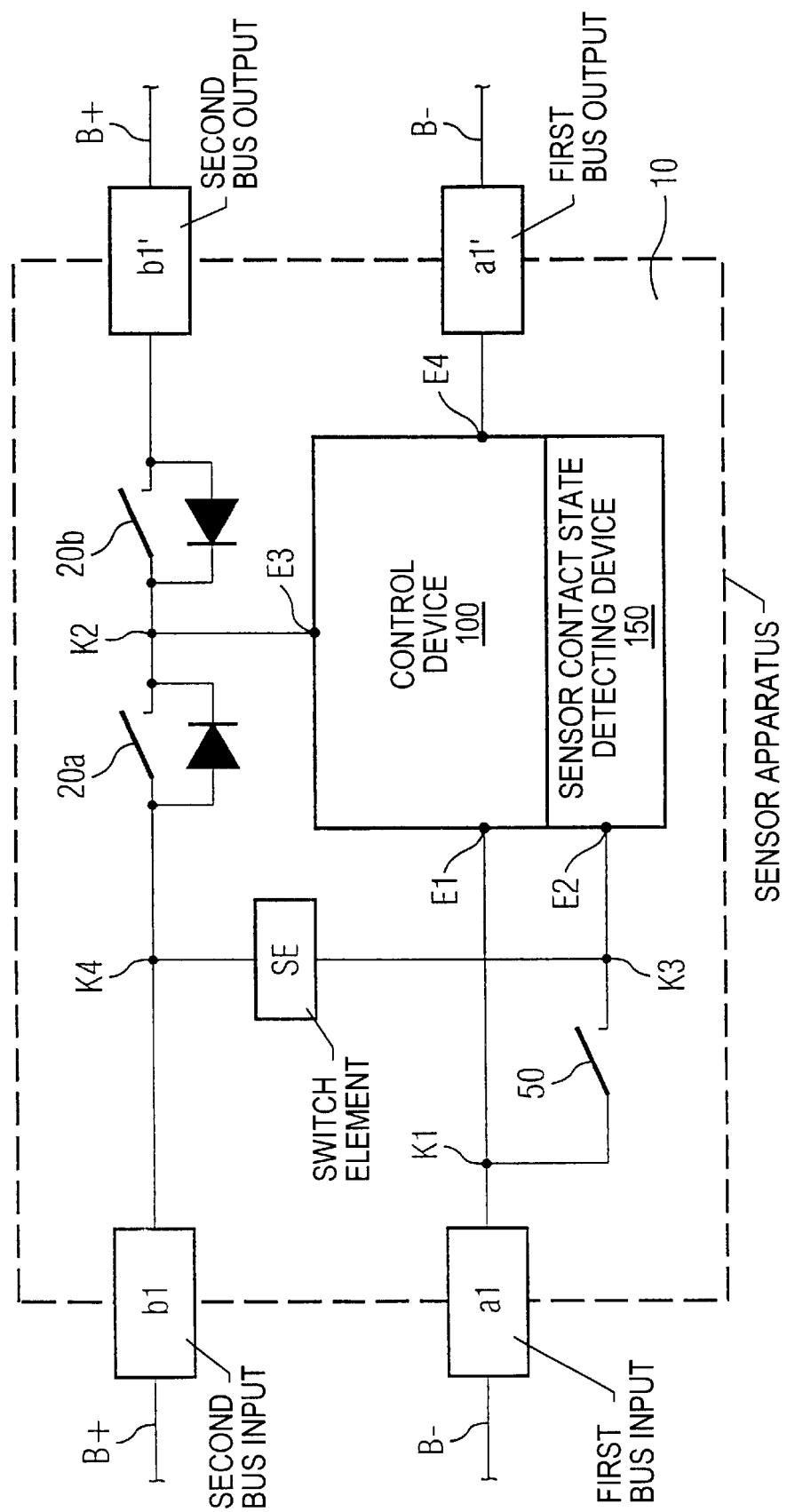
FIG. 1 is a schematic circuit diagram as a first exemplary embodiment of the bus-drivable sensor apparatus according to the current invention.

FIG. 1 is a schematic circuit diagram as a first exemplary embodiment of the bus-drivable sensor apparatus according to the current invention.

In FIG. 1, in addition to the reference numerals explained above, SE indicates a switching element with a direction-dependent current/voltage characteristic curve, which is connected between the nodes K3 and K4, wherein the node K3 is disposed between the sensor contact 50 and the sensor contact state detecting device 150 and the node K4 is disposed between the second bus input b1 and the switch/diode combination 20a.

The switch element SE with the direction-dependent current/voltage characteristic curve is designed and connected between the second connection of the sensor contact 50 and the second bus input b1 in such a way that it essentially does not influence the normal bus operation, independent of the contact state of the sensor contact 50. This provides a simple possibility for testing the sensor contact.

In this first exemplary embodiment, the assumption is that the switch element SE with the direction-dependent current/voltage characteristic curve is designed in such a way that when a voltage is applied to it, depending upon the polarity, it has a very high electrical resistance in one direction and has a very low electrical resistance in the other direction. It is connected in such a way that during normal bus operation, a current flow from K4 to K3 is essentially prevented, wherein the potential at the node K3 when the switch is open is lower than the second potential in the bus line $B^+$.

The testing method for testing the sensor contact 50 of the bus-drivable sensor apparatus 10 will be explained in detail below.

First, the sensor apparatus 10 is uncoupled from the bus $B^+$, $B^+$ on both the input and output side.

Then a measurement of the current/voltage characteristic curve is taken at the first and second bus input a1, b1 in the testing operation, in which the first and second bus input a1, b1 are connected to a third and fourth potential that have a potential difference with a different sign than the first and second potential, in the different contact states of the sensor contact 50, i.e. open and closed, through the use of a multimeter.

The assessment of the quality of the sensor contact 50 on the basis of the measurement result is carried out as follows.

With a correctly functioning sensor contact 50, a current change occurs when a particular test voltage is applied since when the sensor contact is closed, a low-ohm connection can be produced between the bus inputs a1, b1. On the other hand if no current change occurs, then the sensor contact 50 is defective because it remains either open or closed.

Figure 2:
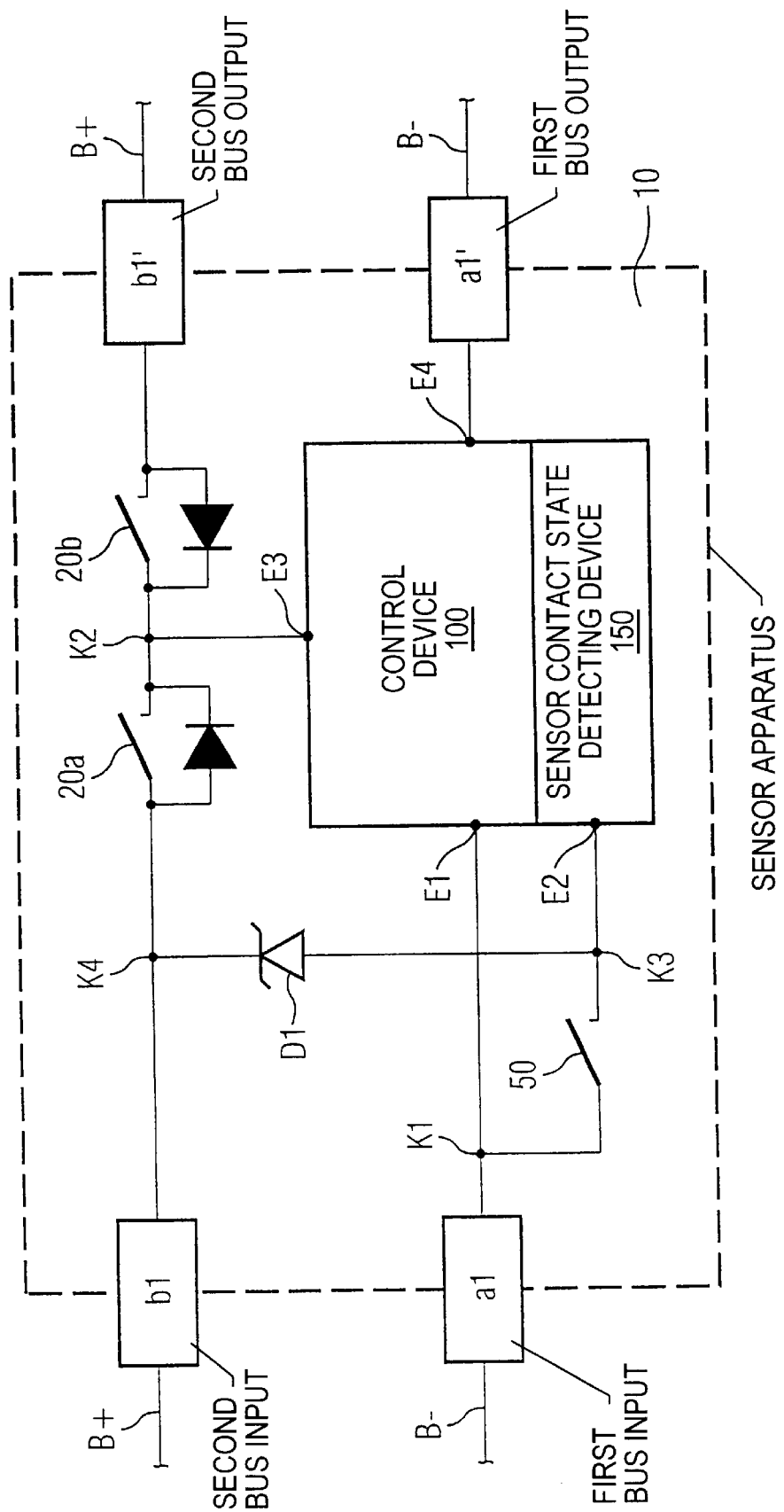
FIG. 2 is a schematic circuit diagram as a second exemplary embodiment of the bus-drivable sensor apparatus according to the current invention.

FIG. 2 is a schematic circuit diagram as a second exemplary embodiment of the bus-drivable sensor apparatus according to the current invention.

In this second exemplary embodiment, D1 indicates the switching element with the direction-dependent current/voltage characteristic curve in the form of a first diode device, which is connected with its positive connection to the second connection of the sensor contact 50 via the node K3 and is connected with its negative connection to the second bus input b1 via the node K4.

Since the first potential is lower than the second potential, the diode device is switched in the off direction during normal bus operation and it therefore essentially does not influence the normal bus operation independent of the contact state of the sensor contact 50 (i.e. except for a slight off-state current).

The testing method takes place analogous to the way described in the first exemplary embodiment.

Figure 3:
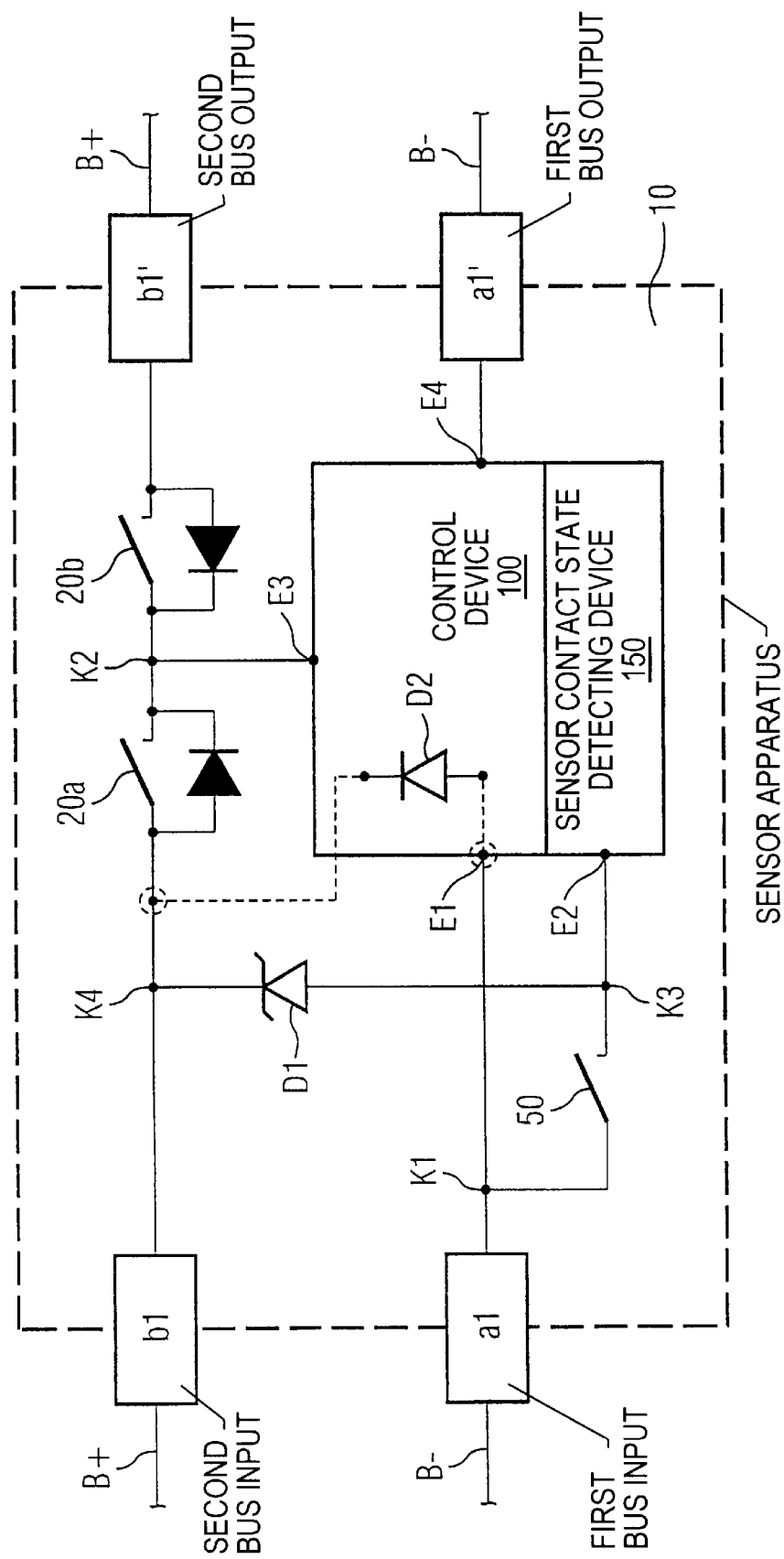
FIG. 3 is a schematic circuit diagram as a third exemplary embodiment of the bus-drivable sensor apparatus according to the current invention.
Figure 4:
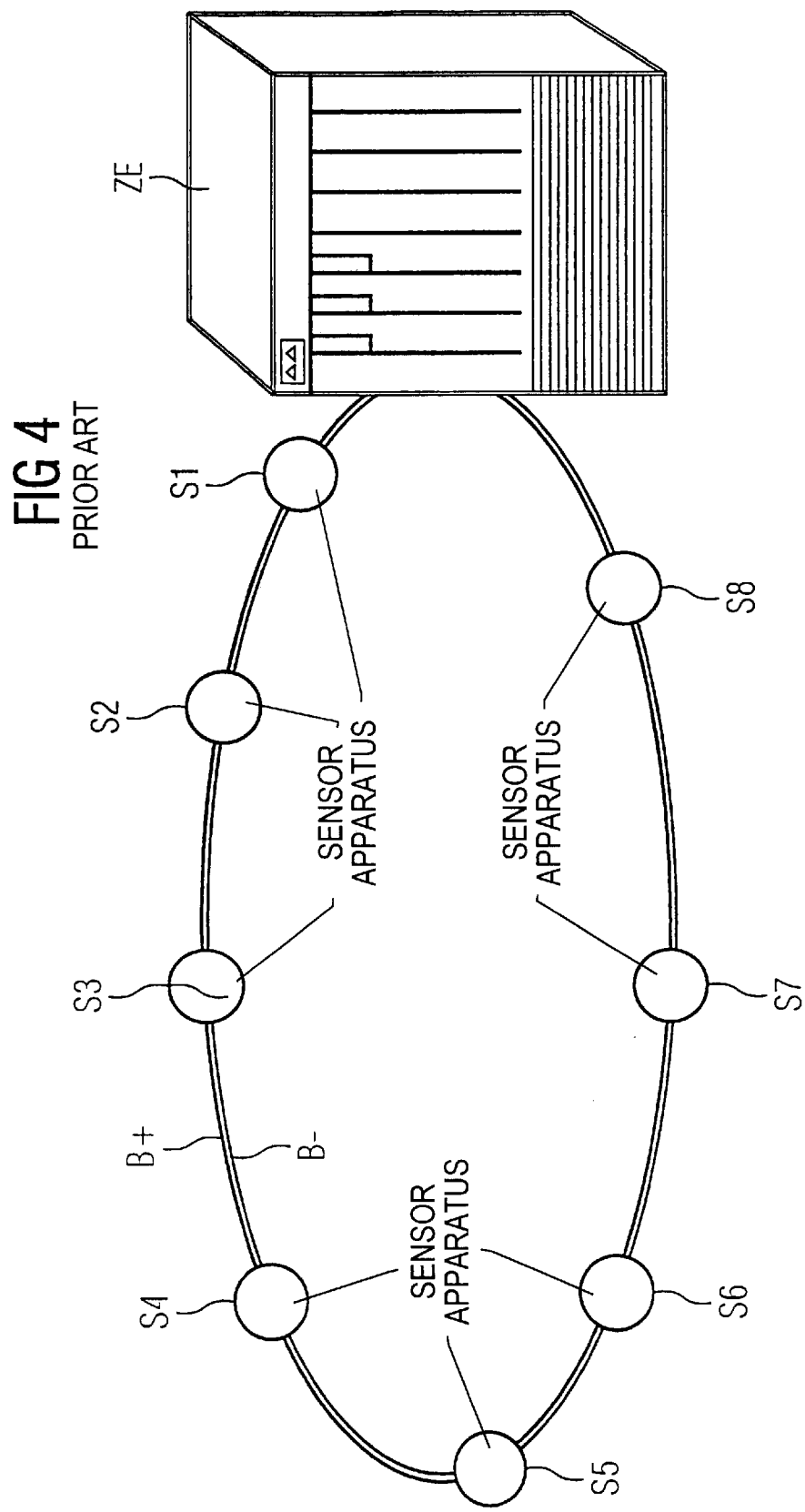
FIG. 4 is a schematic circuit diagram of a conventional arrangement of the number of known sensor apparatuses operated on a field bus or sensor/actuator bus.
Figure 5:
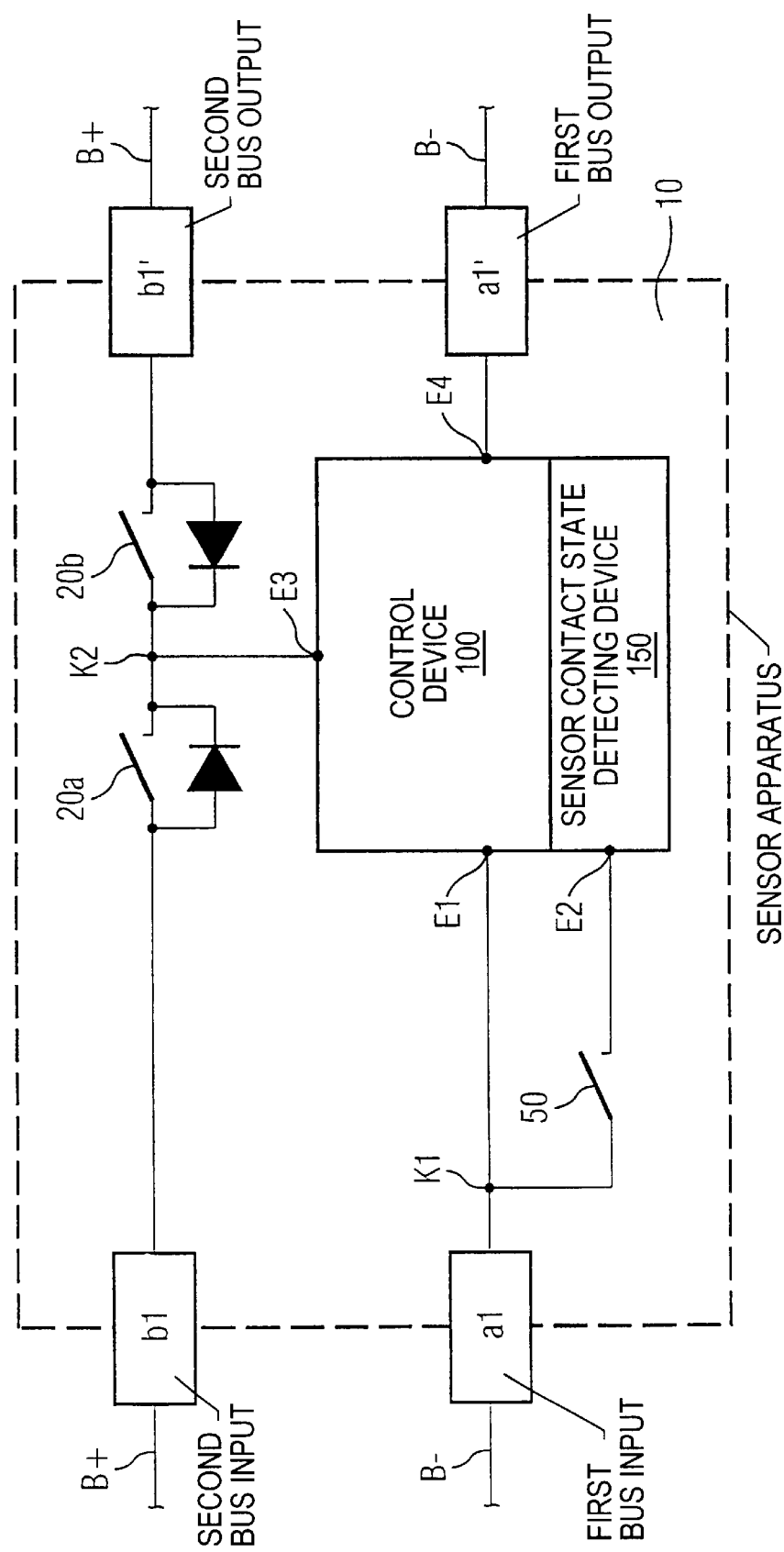
FIG. 5 is a schematic circuit diagram of a known bus-drivable sensor apparatus.

FIG. 3 is a schematic circuit diagram as a third exemplary embodiment of the bus-drivable sensor apparatus according to the current invention.

In FIG. 3, D2 indicates a second diode device contained in the control device 100; this second diode device serves as an electromagnetic compatibility safety device and in the closed contact state of the sensor contact 50, is connected in parallel to the first diode device D1.

In this case, the threshold voltage of the first diode device D1 is selected as lower than the threshold voltage of the second diode device D2. Consequently with a suitable selection of the test voltage, the second diode device D2 has no influence on the above-mentioned testing method.

Although the current invention has been described above in conjunction with a preferred exemplary embodiment, it is not limited to this, but can be modified in numerous ways.

Naturally, the switching element with the direction-dependent current/voltage characteristic curve does not have to be comprised of a single component, but can be comprised of a combination of components.

The selection of the polarity is also arbitrary and reversible. Furthermore, the invention is not limited to the particular bus type described, but can also be used for other bus types and other bus configurations.

Finally, not only can ON/OFF or OFF/ON sensor contacts be used, but also sensor contacts with more than two contact states can be used.

What is claimed is:

1. A bus-drivable sensor apparatus (10) having:
   a first and a second bus input (a1, b1) for connecting to a corresponding first and second bus line (B⁻, B⁺), which have a corresponding first and second potential in normal bus operation;
   a control device (100), which is connected to the first and second bus input (a1, b1);
   a sensor contact (50) with at least two different contact states, which is connected on its first connection to the first bus input (a1); and
   a sensor contact state detecting device (150), which is connected to the second connection of the sensor contact (50) and the control device (100) in order to detect the contact state of the sensor contact (50) and to transmit this information to the control device (100);
   wherein the control device (100) is embodied in such a way that it reacts to a certain transmitted contact state by triggering a predetermined control function;
   characterized by means of
   a switching element with a direction-dependent current/voltage characteristic curve (SE; D1), which is designed and connected between the second connection of the sensor contact (50),and the second bus input (b1) in such a way that it essentially does not influence the normal bus operation, independent of the contact state of the sensor contact (50).

2. The bus-drivable sensor apparatus (10), according to claim 1, characterized in that the switching element with the direction-dependent current/voltage characteristic curve (SE; D1) is wired in.such a way that in a testing operation, in which the first and second bus input (a1, b1) are connected to a third and fourth potential that have a potential difference with a different sign than the first and second potential, a current/voltage characteristic curve that is a function of the contact state of the sensor contact (50) can be detected at the first and second bus input (a1, b1).

3. The bus-drivable sensor apparatus (10) according to claim 1, characterized in that the switching element with the direction-dependent current/voltage characteristic curve (SE; D1) is a first diode device (D1), which is connected with its positive connection to the second connection of the sensor contact (50) and is connected with its negative connection to the second bus input (b1), wherein the first potential is lower than the second potential.

4. The bus-drivable sensor apparatus (10) according to claim 3, characterized in that the control device has a second diode device (D2), in particular as an electromagnetic compatibility safety device, which is connected in parallel to the first diode device (D1) in a contact state of the sensor contact (50) and that the threshold voltage of the first diode device (D1) is lower than the threshold voltage of the second diode device (D2).

5. The bus-drivable sensor apparatus (10) according to claim 1, characterized in that the control device (100) is embodied in such a way that it reacts to a particular transmitted contact state by sending a message via the bus.

6. The bus-drivable sensor apparatus (10) according to claim 1, characterized in that a first and second bus output (a1', b1'), which are connected to the control device (100), are provided for connecting to another first and second bus line (B⁻, B⁺).

7. The bus-drivable sensor apparatus (10) according to claim 6, characterized in that an addressing device (20*a*; 20*b*) is provided, which is disposed between the second bus input (b1) and the second bus output (b1').

8. The bus-drivable sensor apparatus (10) according to claim 1, characterized in that the sensor contact (50) is a switch element, in particular a reed switch, thermal circuit breaker, induction switch, or optical switch.

9. A testing method for testing a sensor contact (50) of a bus-drivable sensor apparatus (10), including the following steps:
   uncoupling of the sensor apparatus (10) from a bus (B⁺, B⁻);
   measuring a current/voltage characteristic curve at a first and second bus input (a1, b1) in a testing operation, in which the first and second bus input (a1, b1) are connected to a third and fourth potential that have a potential difference with a different sign than a first and second potential in different contact states of the sensor contact (50) by using a multimeter; and
   assessing quality of the sensor contact (50) based on a measurement result.

10. The testing method according to claim 9, characterized in that the sensor contact (50) has two contact states, open and closed, and the current/voltage characteristic curve is measured at the first and second bus input (a1, b1) in these two states.

* * * * *